(12) United States Patent
Noirot (10) Patent No.: US 11,060,693 B2
(45) Date of Patent: Jul. 13, 2021

(54) OUTPUT LENSES FOR LEDS AND A METHOD OF FORMING AN OUTPUT LENS

(71) Applicant: SIGNIFY HOLDING B.V., Eindhoven (NL)

(72) Inventor: Remi Noirot, Ambérieux en Dombes (FR)

(73) Assignee: SIGNIFY HOLDING B.V., Eindhoven (NL)

( * ) Notice: Subject to any disclaimer, the term of this patent is extended or adjusted under 35 U.S.C. 154(b) by 11 days.

(21) Appl. No.: 16/623,893

(22) PCT Filed: Jun. 12, 2018

(86) PCT No.: PCT/EP2018/065429
§ 371 (c)(1),
(2) Date: Dec. 18, 2019

(87) PCT Pub. No.: WO2018/234086
PCT Pub. Date: Dec. 27, 2018

(65) Prior Publication Data
US 2021/0148542 A1 May 20, 2021

(30) Foreign Application Priority Data
Jun. 19, 2017 (EP) .................... 17176619

(51) Int. Cl.
*F21V 5/00* (2018.01)
*F21Y 115/10* (2016.01)

(52) U.S. Cl.
CPC ............. *F21V 5/007* (2013.01); *F21V 5/008* (2013.01); *F21Y 2115/10* (2016.08)

(58) Field of Classification Search
CPC ............. F21V 5/04; F21V 5/007; F21V 5/008
See application file for complete search history.

(56) References Cited

U.S. PATENT DOCUMENTS

| 7,828,453 B2 * | 11/2010 | Tran ......................... F21V 9/08 362/84 |
| 9,677,737 B1 | 6/2017 | Sayers |
| 10,636,950 B2 * | 4/2020 | Pickard ................... H01L 33/58 |
| 2008/0278655 A1 | 11/2008 | Moon et al. |

(Continued)

FOREIGN PATENT DOCUMENTS

| CN | 101858558 B | 3/2013 |
| CN | 104100929 A | 10/2014 |

(Continued)

*Primary Examiner* — Evan P Dzierzynski (57) ABSTRACT

An optical system has a set of inner portions, each for mounting over an LED or LED arrangement, and an outer portion, for mounting over the inner portion. The outer portion is adapted to be mountable over each one of the set of inner portions, thereby to form an output lens when the outer portion is mounted over a selected one of the set of inner portions. The output lens has an overall optical function which depends on the selected inner portion. In this way, an optical lens function may be selected simply by choosing an appropriate one from a set of inner portions (or by not using an inner portion at all). The inner portions are low cost components, and they avoid the need for any tooling changes to the larger outer portions.

15 Claims, 6 Drawing Sheets

(56) References Cited

U.S. PATENT DOCUMENTS

| | | | |
|---|---|---|---|
| 2014/0268810 A1* | 9/2014 | Marquardt | F21V 23/005 |
| | | | 362/308 |
| 2015/0062920 A1* | 3/2015 | Wu | F21V 5/04 |
| | | | 362/311.02 |
| 2016/0061387 A1 | 3/2016 | Liang et al. | |
| 2016/0131327 A1* | 5/2016 | Moon | F21V 5/008 |
| | | | 362/235 |

FOREIGN PATENT DOCUMENTS

| | | |
|---|---|---|
| CN | 104373897 A | 2/2015 |
| CN | 105782905 A | 7/2016 |
| DE | 102014213377 A1 | 1/2016 |
| EP | 2743998 B1 | 9/2015 |
| KR | 20130110997 A | 10/2013 |
| WO | 2014063011 A1 | 4/2014 |

* cited by examiner

OUTPUT LENSES FOR LEDS AND A METHOD OF FORMING AN OUTPUT LENS

CROSS-REFERENCE TO PRIOR APPLICATIONS

This application is the U.S. National Phase application under 35 U.S.C. § 371 of International Application No. PCT/EP2018/065429, filed on Jun. 12, 2018, which claims the benefit of European Patent Application No. 17176619.9, filed on Jun. 19, 2017. These applications are hereby incorporated by reference herein.

FIELD OF THE INVENTION

This invention relates to output lenses used for shaping the light output from an LED or LED arrangement.

BACKGROUND OF THE INVENTION

The light output from an LED or LED arrangement is often shaped or steered by an optical arrangement, before being output from a light exit aperture of a luminaire. LEDs typically have a Lambertian light output distribution, and an output lens and/or collimator is often used to provide a more directed output beam.

Different lighting applications require different beam shaping functions, and hence different output lens or collimator designs.

By way of example, an asymmetric light output is desired in road lighting, which thus requires beam shaping of an LED output. The light output is desired to extend a long way along the road direction so that fewer light poles are needed. However, the light output is desired to extend across a smaller distance across the road direction, so that light output is not wasted.

Different road layouts require different lighting solutions, depending on the road size and path followed, and the presence or not of a sidewalk which also needs to be illuminated. If a road is in close proximity to housing, there is then increased need for light shielding away from the road.

Current luminaires for road and street applications are ordered using so called choice sheets. The many choices available in such choice sheets lead to a huge diversity of products that can be ordered. As a consequence, outdoor luminaires are made to order where, in many cases, only a few products are made to any particular design. This leads to inefficiency in production and an increased chance for mistakes.

One example of optical system is in the form of a molded lens over each individual LED or over a chip which defines an array of LEDs. The lenses are integrated as part of an optical plate which carries a large number of LEDs. The lens mold has a cavity which sits over the LED or LED chip and an outer lens surface. The shapes of the two surfaces (each of which forms an air/material refractive index boundary) defines the lens function. In order to define a different optical function, it is known to change only the part of the mold which defines the cavity shape. However, this means the mold tooling needs to be changed to manufacture different orders.

There is therefore a need for a solution which enables low cost and simple adaptation of the lens function so that the lens can be tailored to different end applications.

SUMMARY OF THE INVENTION

The invention is defined by the claims.

According to examples in accordance with an aspect of the invention, there is provided an optical system, comprising:

a set of inner portions, each for mounting over an LED or LED arrangement, and each of which performs a different first optical function, wherein each inner portion has an outer contact surface; and an outer portion, for mounting over the inner portion, and which performs a second optical function, and wherein the outer portion has a cavity with an inner contact surface, and an outer lens surface, wherein the outer portion is adapted to be mountable over each one of the set of inner portions, thereby to form an output lens when the outer portion is mounted over a selected one of the set of inner portions, which output lens has an overall optical function which depends on the selected inner portion, wherein the inner and outer portions have the same refractive index and wherein the outer contact surface of the inner portions and the inner contact surface of the outer portion have a matching shape such that an interface between the inner portion and the outer portion does not have a lens function.

This optical system makes use of a set of inner lens portions which fit into a cavity of a single design of outer portion. In this way, a different optical function may be created simply by selecting a suitable inner portion. The inner portion may be a small and thin component and hence lower cost than the outer portion and furthermore it renders the optical system relatively compact due to the matching shape with the outer portion, thereby avoiding unnecessary spacious cavities in between the inner and outer portions. By making multiple designs of inner portion, in particular of an inner cavity surface of the inner portion opposite the outer contact surface, specific tooling changes are not needed, because a desired optical function can be obtained simply by selecting a pre-manufactured inner portion. This also makes the manufacture run more predictable, and enables more accurate control of the number of outer portions that are to be manufactured, since the total number of outer portions then corresponds to the total number of desired lenses.

The inner portions function as beam extenders, which may be used to extend the output beam in various ways compared to the function of the outer portion. Thus, the outer portion alone may define one of the possible optical lens designs, which may be considered to be a reference design. The system enables late stage configuration of the lenses at the final assembly point, and by using low size inner portions the total volume of components is kept to a minimum.

While additional tooling is required to manufacture the inner portions independently, the tooling cost is kept low by making the inner portions as small components.

The inner and outer portions have the same refractive index.

Note that by "same refractive index" is meant at one wavelength which is within the range of output wavelengths of the LED or LED arrangement. This means that the interface between the inner and outer portions does not contribute to the overall lens function, because in the optical system of the invention, when the outer contact surface of the inner portions and the inner contact surface of the outer portion have a matching shape, said interface does not have a lens function. In particular, but not exclusively, for this situation, the inner and outer portions are for example made from the same material. This simplifies the overall manufacture.

The system may further comprise a glue for insertion between the inner portion and the outer portion. This may be used to avoid Fresnel losses.

The inner portions may be formed of silicone. This can avoid the need for a glue as the inner portion can be a simple push fit into the cavity of the outer portion.

The inner portions for example comprise a cavity for mounting over the LED or LED arrangement. Thus, one refractive index boundary is defined at the inner surface of the inner portion cavity and another refractive index boundary is defined at the outer surface of the outer portion.

The inner portions for example comprise a flange and the outer portion comprises a recess for receiving the flange. This provides an easy way to ensure a desired positional relationship between the inner and outer portions.

The outer portion may comprise a channel around the recess. This channel may be used to catch excess glue resulting from a gluing process.

Both the outer portion and the inner portion each may have a respective base surface, for example a circular base, i.e. a base with a circular perimeter. Said base surface may be flat, but alternatively may have a contour adapted to a structure of a substrate on which a LED (arrangement) is mounted, for easy alignment and orientation of the output lens on the substrate. Furthermore, in assembled position of the inner portion with the outer portion the base surface of the inner portion may be flush with the base surface of the outer portion, to counteract undesired light losses and/or light to be issued in undesired directions.

The invention also provides an LED output lens formed from the optical system as defined above, for example in that the inner portion is permanently fixed to the outer portion or that the output lens cannot be disassembled without being damaged or without use of special tooling.

The invention also provides a lighting unit comprising:
an LED or LED arrangement; and
an LED output lens as defined above mounted over the LED or LED arrangement.

The LED or LED arrangement for example comprises a chip on board LED arrangement or a set of chip scale packages.

The lighting unit may comprise a plurality, for example at least two, combinations (or pairs) of an outer lens portion with an inner lens portion, for example four, eight, twenty or hundred combinations/pairs, each combination/pair having a respective optical lens activity/property, wherein at least two of the optical lens activities/properties are mutually different.

Examples in accordance with another aspect of the invention provide a method of forming an output lens for an LED or LED arrangement, comprising:
selecting an inner portion from a set of different inner portions, for mounting over the LED or LED arrangement, wherein each inner portion of the set performs a different first optical function, wherein each inner portion has an outer contact surface;
mounting an outer portion over the selected inner portion, which outer portion performs a second optical function, wherein the outer portion has a cavity with an inner contact surface, and an outer lens surface, and the outer portion is mounted over the inner portion with the inner contact surface contacting the outer contact surface to form an interface and to define a unitary optical component with an overall optical function which depends on the first and second optical functions and wherein the inner portion and the outer portion have matching shape and have a same index of refraction such that the interface does not have a lens function.

This method enables an optical function to be selected at the final installation stage, by making an appropriate combination of inner and outer portions. The method may further comprise providing a glue between the inner portion and the outer portion.

The inner portion for example comprises a cavity, wherein the method comprises mounting the lens over the LED or LED arrangement with the LED or LED arrangement in the cavity. The method may comprise mounting a flange of the inner portion in a recess of the outer portion. This provides a secure connection between the two portions.

BRIEF DESCRIPTION OF THE DRAWINGS

Examples of the invention will now be described in detail with reference to the accompanying drawings, in which:

FIG. 3 shows an optical system in accordance with an example of the invention, in which FIG. 3A shows an inner portion, FIG. 3B shows the inner portion positioned over an outer portion and FIG. 3C shows the formed output lens;

DETAILED DESCRIPTION OF THE EMBODIMENTS

The invention provides an optical system which has a set of inner portions, each for mounting over an LED or LED arrangement, and an outer portion, for mounting over the inner portion. The outer portion is adapted to be mountable over each one of the set of inner portions, thereby to form an output lens when the outer portion is mounted over a selected one of the set of inner portions. The output lens has an overall optical function which depends on the selected inner portion (or by not using an inner portion at all). In this way, an optical lens function may be selected simply by choosing an appropriate one from a set of inner portions. The inner portions are low cost components, and they avoid the need for any tooling changes to the larger outer portions.

Figure 1:
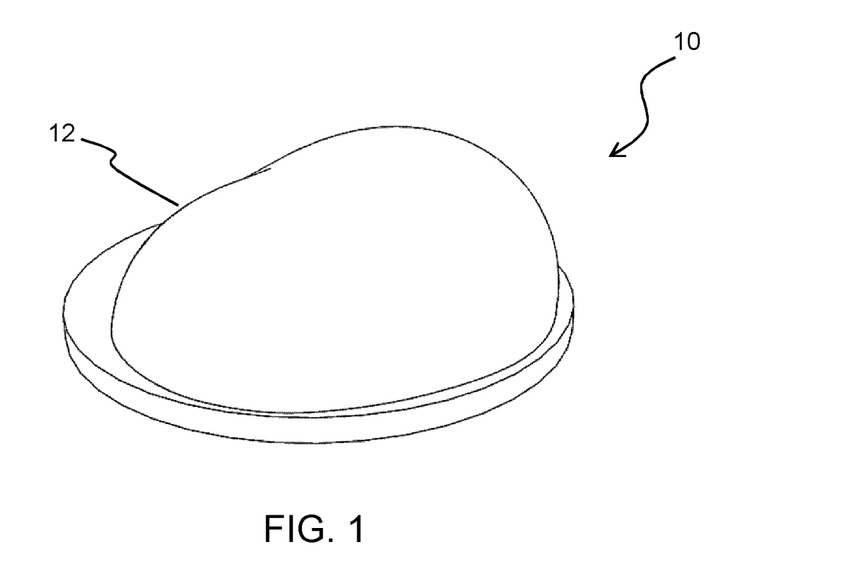
FIG. 1 shows a known output lens which is for placement over an LED or LED arrangement, from above.

FIG. 1 shows a known output lens 10 which is for placement over an LED or LED arrangement. FIG. 1 shows the lens from above. The LED arrangement may be a chip on board arrangement of LEDs.

The lens has an outer surface 12.

Figure 2:
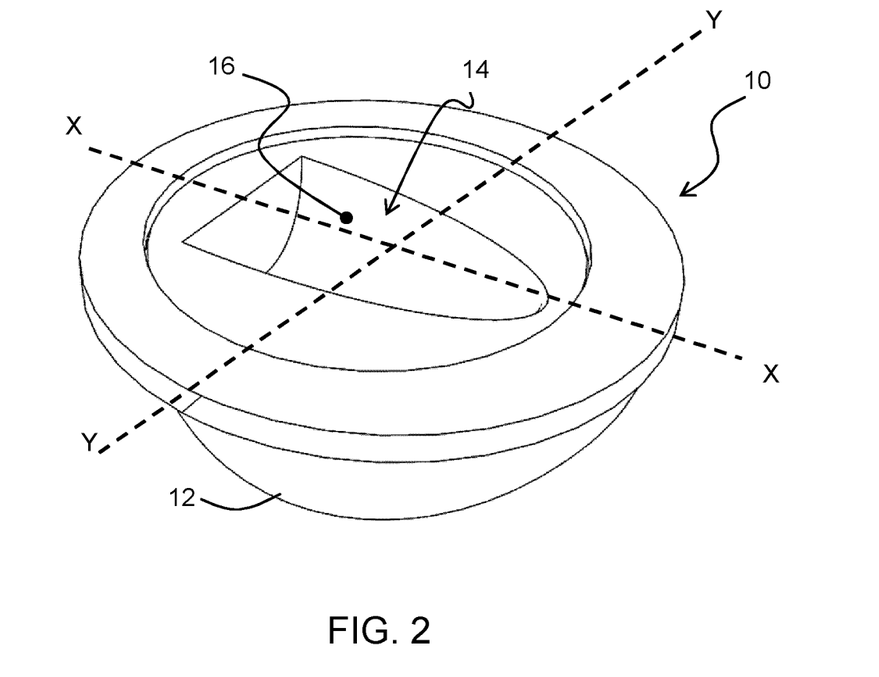
FIG. 2 shows the lens of FIG. 1 from below.

FIG. 2 shows the lens from below. It shows a cavity 14 which forms an inner surface 16. The optical function of the lens is defined by the inner and outer surfaces 16, 12. In combination, they define a beam width, which may be different in two orthogonal directions for example for a road lighting application.

In general, the invention is of interest for relatively large lenses of the same general type as shown in FIGS. 1 and 2, for example having a linear dimension perpendicular to the optical axis with exceeds 25 mm, for example in the range 50 mm to 150 mm, typically in the range 50 mm to 100 mm. The example of FIGS. 1 and 2 shows a lens which has a circular base, so the largest dimension (again perpendicular to the optical axis) is the diameter of that circular base.

In a luminaire, there may be a single lens, or there may be a set of the lenses arranged in a line or grid, for example between 1 and 10 lenses. In general, the total number of lenses for the complete luminaire is typically rather low, therefore each LED or LED arrangement is rather large, each of them having a large flux package.

The LED or LED arrangement covered by the lens may be a Chip on Board (CoB) configuration having an array of LEDs. These typically comprise a light emitting area in the shape of a circle, for example with diameter from 6 mm to 23 mm. Alternatively, the LED arrangement may be a close pack of chip scale packages (CSPs).

Figure 3:
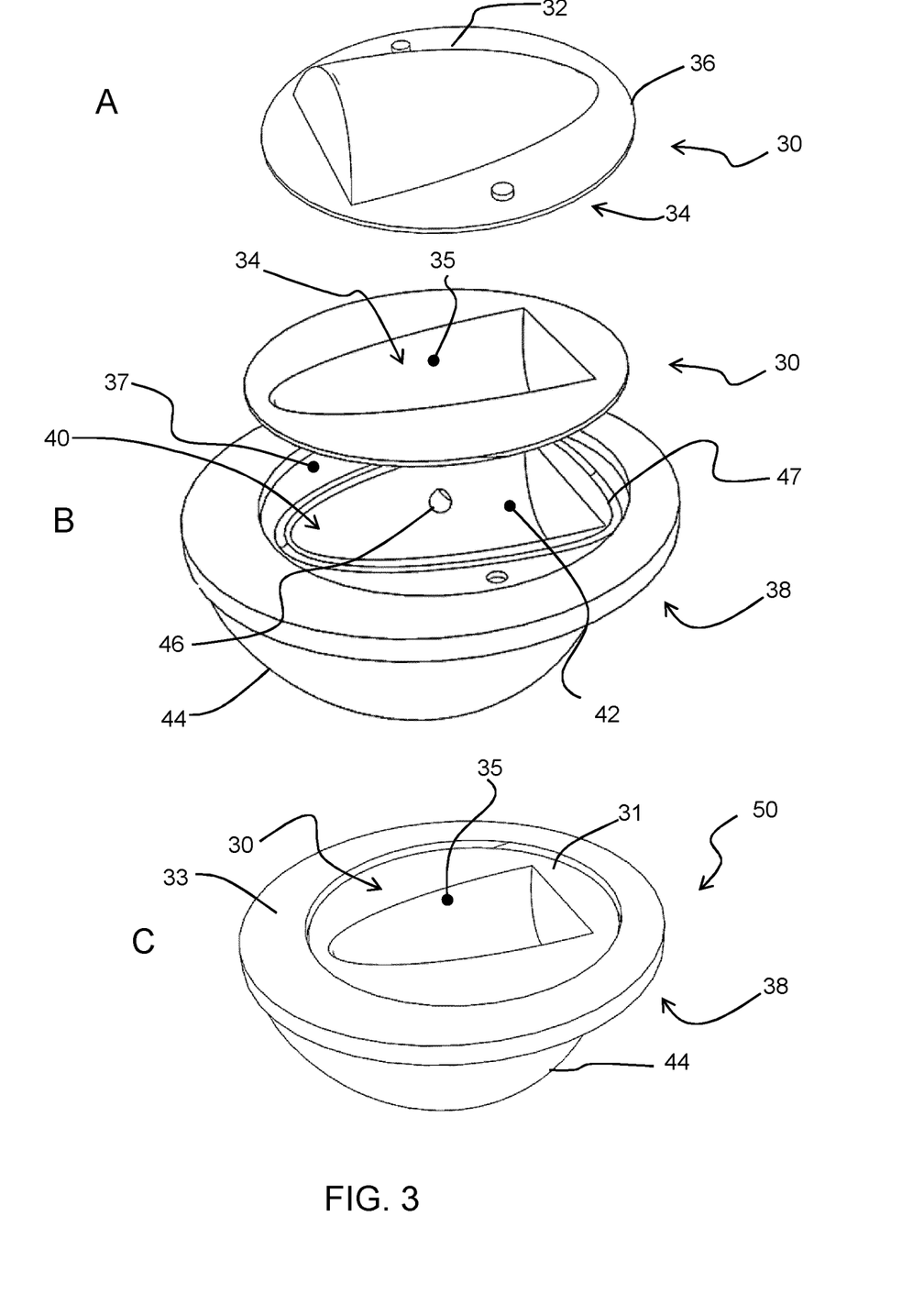

FIG. 3 shows an optical system in accordance with an example of the invention.

FIG. 3A shows an inner portion 30. This component performs a first optical function, in particular a first beam shaping function for example in two orthogonal directions. It is one component of a set of set of inner portions, each of which performs a different first optical function. The inner portion has an outer contact surface 32 opposite an inner cavity 34. The inner portion is essentially in the form of a web which may be molded. The inner portion has an outer web 36, for example a circular flange. This circular flange is smaller than the base of the outer lens portion, so generally has a diameter in the range 20 mm to 125 mm. Of course, any flange shape may be used.

FIG. 3B shows the inner portion 30 positioned over an outer portion 38. It shows that the inner cavity 34 is formed by an inner cavity surface 35. The outer portion is for mounting over the inner portion (or equivalently, the inner portion is for mounted within the outer portion). The outer portion 38 performs a second optical function. It has a recess 37 for receiving the flange 36 to define a fixed positional relationship between the inner and outer portions. It also has a cavity 40 with an inner contact surface 42, and an outer lens surface 44.

The inner contact surface 42 of the outer portion and the outer contact surface 32 of the inner portion have corresponding shape and they are designed to mate with each other with no air gap between them. Thus, they have an exact match. They may mate directly or there may be glue between them as discussed below.

The outer portion 38 may define a reference design, for which a first possible lens function is defined without any inner portion.

When the outer portion is mounted over a selected one of the set of inner portions, a modified output lens 50 is formed as shown in FIG. 3C. The output lens has an overall optical function which depends on the selected inner portion 30. In particular, the inner cavity surface 35 and the outer lens surface 44 define the optical function, whereas the interface between the inner portion and the outer portion is the same for all different combinations. In the output lens 50 shown in FIG. 3C, the inner portion has a flat base surface, also referred to as flange 31 which is recess with respect to a flat base surface, also simply referred to as base 33 of the outer portion 38.

This optical system makes use of a set of inner lens portions 30 which fit into a cavity 40 of a single design of outer portion. By making multiple designs of inner portion 30, tooling changes for a particular application are not needed, because a desired optical function can be obtained simply by selecting a pre-manufactured inner portion.

The inner portions for example function as beam extenders, which may be used to extend the output beam in various ways compared to the function of the outer portion. The desired optical function can be set at the final assembly point, and by using low size inner portions the total volume of components is kept to a minimum.

The boundary between the inner and outer portions 30, 38 does not need to perform a particular optical function. Indeed, the two portions may have the same refractive index. This "same refractive index" is at one wavelength which is within the range of output wavelengths of the LED or LED arrangement. The inner and outer portions are for example made from the same material. This simplifies the overall manufacture.

The two portions may have different refractive index, in which case the boundary shape will have an optical effect. However, this is factored into the design of the shape of the two other surfaces to provide the desired overall lens function.

FIG. 3B shows a glue 46 inserted between the inner portion 30 and the outer portion 38. This may be used to avoid Fresnel losses.

The outer portion is for example molded PC or PMMA, or silicone or glass. The inner portion may also be PC, PMMA or silicone. The use of silicone at least for the inner portion can avoid the need for a glue as the inner portion can be a simple push fit into the cavity of the outer portion.

When a glue is to be used, a channel 47 may be provided around the recess 39 to catch excess glue.

Figure 4:
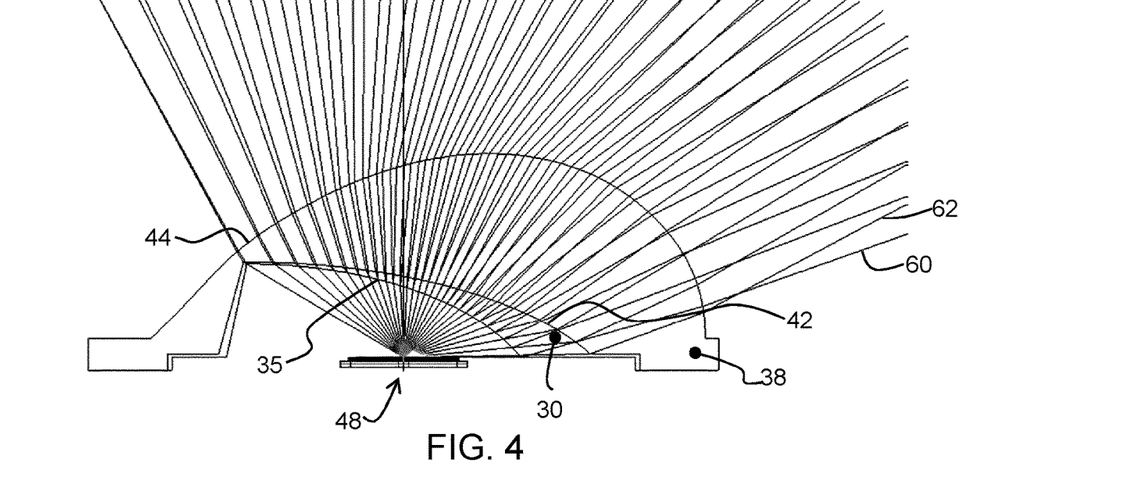
FIG. 4 shows a cross section of the lens of FIG. 3 along a first direction, in particular a cross section through line X-X in FIG. 2.

FIG. 4 shows a cross section of the lens along a first direction, in particular a cross section through line X-X in FIG. 2. This is for example a road width direction.

FIG. 4 also shows the LED arrangement 48 located in the cavity 34 (if there is an inner lens portion) or in the cavity 40 (if there is no inner lens portion).

Beam paths are shown for the reference design of only the outer portion 38 and for the modified design with an inner portion 30 which is designed to create a wider beam in the road width direction. Beam 60 for example results when the inner portion is present compared to beam 62 when it is not.

Figure 5:
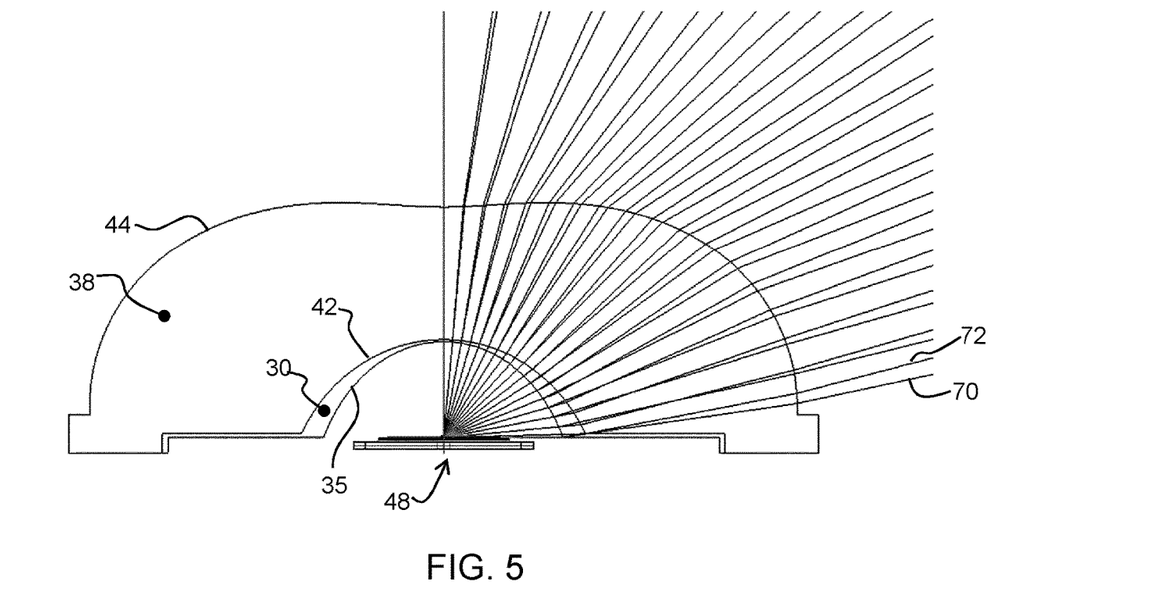
FIG. 5 shows a cross section of the lens along a second direction, in particular a cross section through line Y-Y in FIG. 2.

FIG. 5 shows a cross section of the lens along a second direction, in particular a cross section through line Y-Y in FIG. 2. This is for example a road length direction.

Beam paths are shown (for one half of the lens only—it is left-right symmetrical) for the reference design of only the outer portion 38 and for the modified design with a first choice of inner portion 30 which is designed to create a wider beam in the road length direction. Beam 70 for example results when the inner portion is present compared to beam 72 when it is not.

Figure 6:
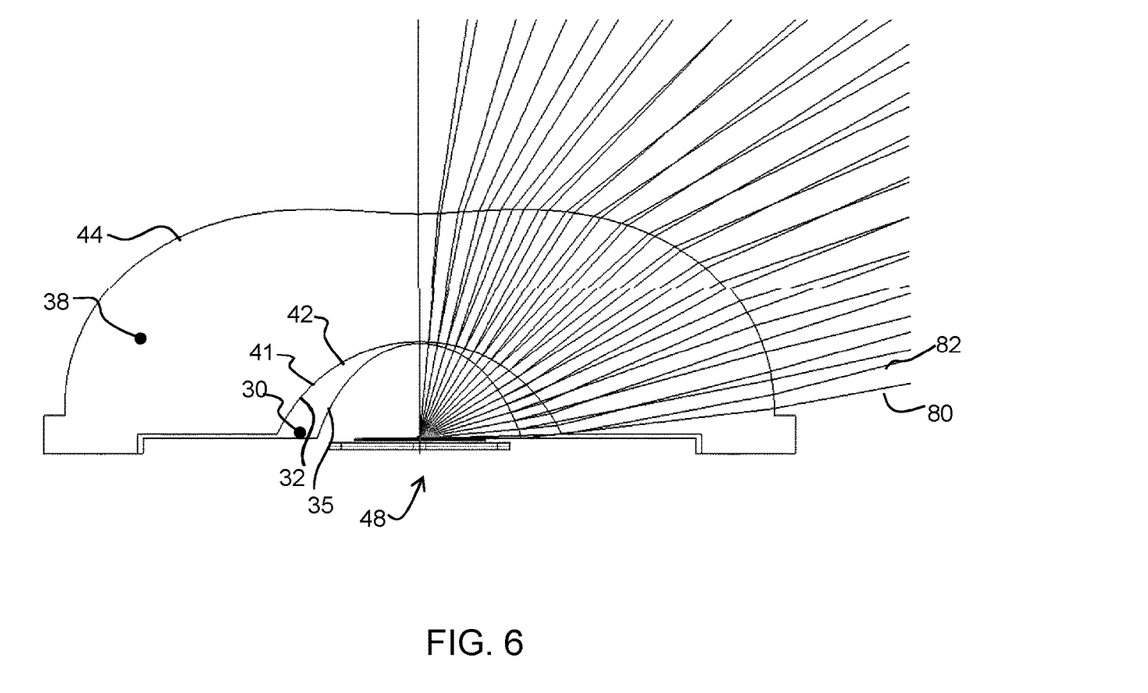
FIG. 6 shows a cross section of the lens along the second direction for a different inner lens portion.

FIG. 6 shows a cross section of the lens along a second direction for a different inner lens portion again for a cross section through line Y-Y in FIG. 2.

Beam paths are shown for the reference design of only the outer portion 38 and for the modified design with a second choice of inner portion 30 which is designed to create an even wider beam in the road length direction. Beam 80 for example results when the inner portion is present compared to beam 82 when it is not.

In the left half of the design given in FIG. 6, an interface 41 is shown between the outer surface 32 of the inner portion 30 and the inner surface 42 of the outer portion 38. Due to the matching shape of said outer surface 32 with said inner surface 42, the interface 41 has no optical function, i.e. no refraction (and no purposely reflection) occurs at the interface. Hence, said interface does not contribute to an overall lens function of the optical system.

Figure 7:
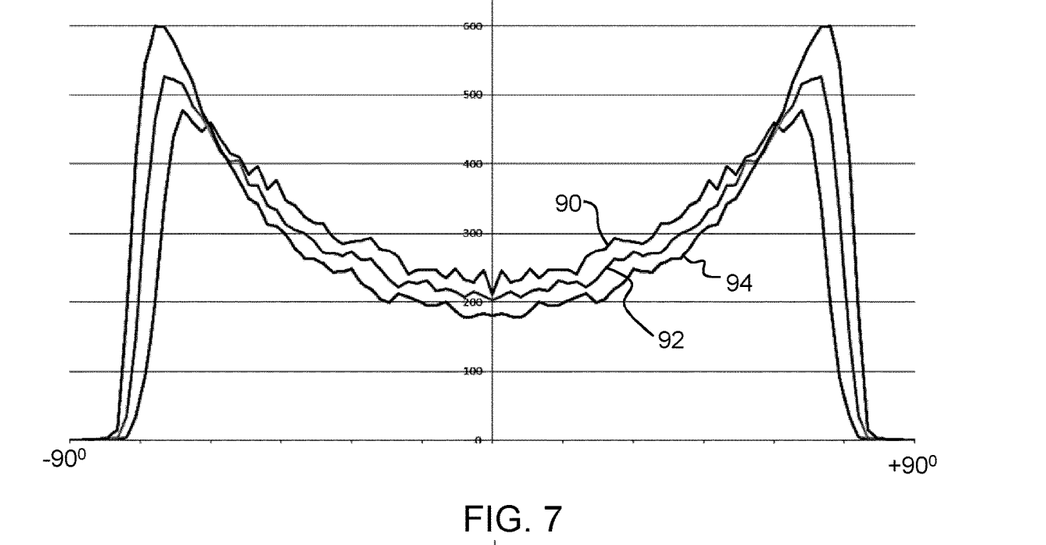
FIG. 7 shows intensity profiles for a road lighting luminaire parallel to the road axis, as intensity versus angle.

FIG. 7 shows intensity profiles parallel to the road axis, as intensity versus angle. Plot 90 is for the reference lens design with no inner portion. Plot 92 is for the inner portion design of FIG. 5, and plot 64 is for the inner portion design of FIG. 6.

Figure 8:
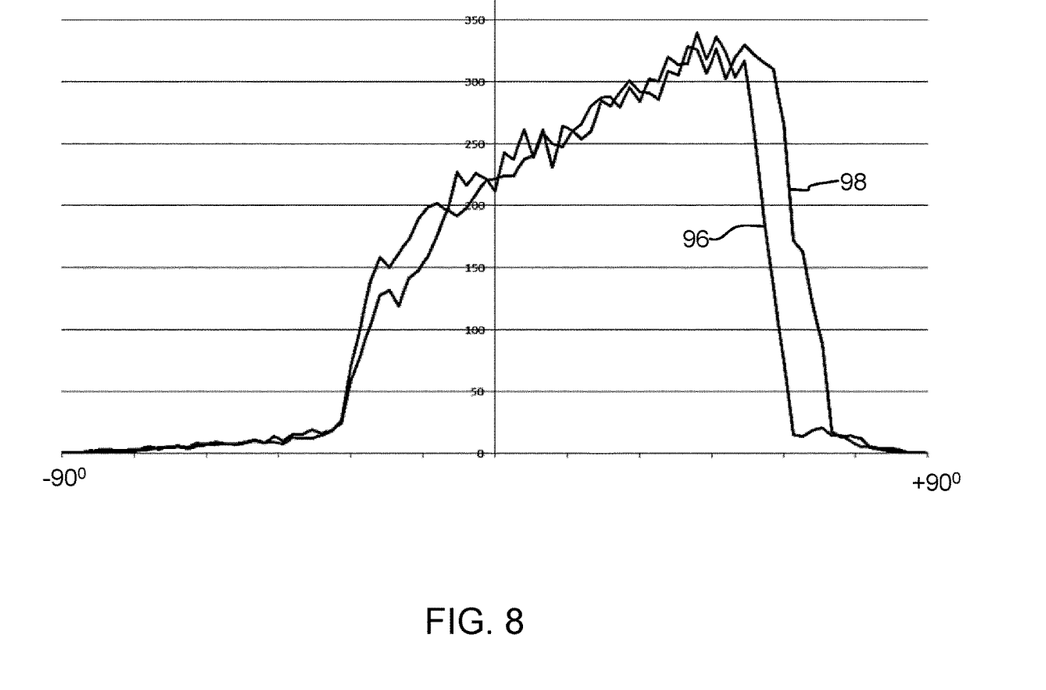
FIG. 8 shows intensity profiles for a road lighting luminaire perpendicular to the road axis, as intensity versus angle.

FIG. 8 shows intensity profiles perpendicular to the road axis, as intensity versus angle. Plot 96 is for the reference lens design with no inner portion. Plot 98 is for the inner portion design of FIG. 4.

Figure 9:
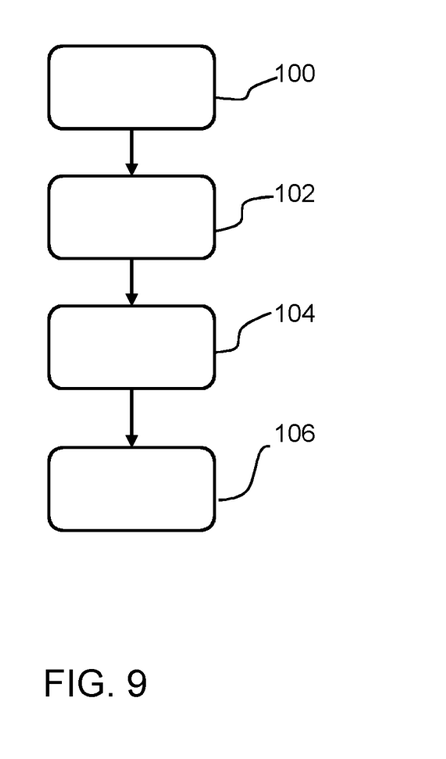
FIG. 9 shows a method of forming and using an output lens for an LED or LED arrangement.

FIG. 9 shows a method of forming an output lens for an LED or LED arrangement, comprising:

in step 100, selecting an inner portion from a set of different inner portions, for mounting over the LED or LED arrangement; and in step 102, mounting an outer portion over the selected inner portion to form an output lens.

The method may further comprise in step 104 mounting the output lens over an LED or LED arrangement to form an LED module and in step 106 forming a luminaire using the LED module. This may be performed as part of an installation procedure, so that the final optical functionality can be defined late in the design process.

As will be clear from the example above, the invention is of interest for road lighting luminaires, because many different lighting profiles are needed for different road layouts. However, the invention is of interest generally for lighting systems for which different beam characteristics are desired in different parts of the overall system.

The use of different inner portion does not impact on the optical efficiency of the system.

The invention is of particular interest for large lenses, so that the cost difference between the inner portions and the outer portions is significant (so it is not economically sensible simply to over-manufacture multiple designs of the overall lens). This is the case for chip on board LED arrays or lenses for other LED clusters.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An optical system, comprising:
   a set of inner portions, each for mounting over an LED or LED arrangement, and each of which performs a different first optical function, wherein each inner portion has an outer contact surface; and
   an outer portion, for mounting over the inner portion, and which performs a second optical function, and wherein the outer portion has a cavity with an inner contact surface, and an outer lens surface,
   wherein the outer portion is adapted to be mountable over each one of the set of inner portions, thereby to form an output lens when the outer portion is mounted over a selected one of the set of inner portions, which output lens has an overall optical function which depends on the selected inner portion,
   wherein the inner and outer portions have the same refractive index, and
   wherein the outer contact surface of the inner portions and the inner contact surface of the outer portion have a matching shape such that an interface between the inner portion and the outer portion does not have a lens function.

2. An optical system as claimed in claim 1, wherein the inner and outer portions are made from the same material.

3. An optical system as claimed in claim 1, further comprising a glue for insertion between the inner portion and the outer portion.

4. An optical system as claimed in claim 1, wherein the inner portions are formed of silicone.

5. An optical system as claimed in claim 1, wherein the inner portions comprise a cavity for mounting over the LED or LED arrangement.

6. An optical system as claimed in claim 1, wherein the inner portions comprise a flange and the outer portion comprises a recess for receiving the flange.

7. An optical system as claimed in claim 6, wherein the outer portion comprises a channel around the recess.

8. An LED output lens formed from the optical system as claimed in claim 1.

9. A lighting unit comprising:
   an LED or LED arrangement; and
   an LED output lens as claimed in claim 8 mounted over the LED or LED arrangement.

10. A lighting unit as claimed in claim 9, wherein the LED or LED arrangement comprises a chip on board LED arrangement or a set of chip scale packages.

11. A lighting unit as claimed in claim 9, comprising a plurality of combinations of an outer lens portion with an inner lens portion, wherein at least two of said combinations have a respective, but mutually different, optical lens activity.

12. A method of forming an output lens for an LED or LED arrangement, comprising:
   selecting an inner portion from a set of different inner portions, for mounting over the LED or LED arrangement, wherein each inner portion of the set performs a different first optical function, wherein each inner portion has an outer contact surface; and
   mounting an outer portion over the selected inner portion, which outer portion performs a second optical function, wherein the outer portion has a cavity with an inner contact surface, and an outer lens surface, and the outer portion is mounted over the inner portion with the inner contact surface contacting the outer contact surface to form an interface and to define a unitary optical component with an overall optical function which depends on the first and second optical functions and wherein the outer contact surface of the inner portion and the inner contact surface of the outer portion have matching shape and have a same index of refraction such that the interface does not have a lens function.

13. A method as claimed in claim 12, further comprising providing a glue between the inner portion and the outer portion.

14. A method as claimed in claim 12, wherein the inner portion comprises a cavity, wherein the method comprises mounting the lens over the LED or LED arrangement with the LED or LED arrangement in the cavity.

15. A method as claimed in claim 12, comprising mounting a flange of the inner portion in a recess of the outer portion.

* * * * *